(12) United States Patent
Marshall

(10) Patent No.: US 7,174,650 B1
(45) Date of Patent: Feb. 13, 2007

(54) SLIDING RULER SQUARE

(76) Inventor: George Thomas Marshall, P.O. Box 953, Windsor, CA (US) 95492

( * ) Notice: Subject to any disclaimer, the term of this patent is extended or adjusted under 35 U.S.C. 154(b) by 0 days.

(21) Appl. No.: 11/163,977

(22) Filed: Nov. 5, 2005

(51) Int. Cl.
B43L 7/027 (2006.01)

(52) U.S. Cl. ........................................ 33/427

(58) Field of Classification Search ................. 33/427, 33/429, 452, 464, 474, 476, 478, 480, 481
See application file for complete search history.

(56) References Cited

U.S. PATENT DOCUMENTS

| | | | | |
|---|---|---|---|---|
| 579,952 A | * | 4/1897 | Campbell | 33/44 |
| 768,324 A | * | 8/1904 | Breul | 33/429 |
| 3,488,868 A | * | 1/1970 | Gutowski et al. | 33/464 |
| 3,805,397 A | * | 4/1974 | Wilamowski | 33/478 |
| 5,813,126 A | * | 9/1998 | Dahl | 33/474 |
| 6,604,296 B2 | * | 8/2003 | Mastrobattista | 33/640 |
| 7,114,264 B1 | * | 10/2006 | Hurley et al. | 33/423 |
| 2003/0037453 A1 | * | 2/2003 | Mastrobattista | 33/640 |

* cited by examiner

Primary Examiner—Christopher W. Fulton
(74) Attorney, Agent, or Firm—Craig M. Stainbrook; Stainbrook & Stainbrook, LLP

(57) ABSTRACT

The present invention is a sliding ruler square that provides an adjustable and extendible straightedge element permitting a user to conveniently scribe lengthy cut lines at pre-selected angles across a work piece typically utilized in the construction industry without the necessity as exhibited by the prior art to reposition the tool. The inventions comprises a right triangularly shaped base with a fence on one base edge, a sliding straightedge on the other base edge and markings along the straightedge and the hypotenuse and other edges of the base to present a variety of ways to measure and mark. The tool combines a number of measurement and scribing functions typically requiring several tools.

6 Claims, 3 Drawing Sheets

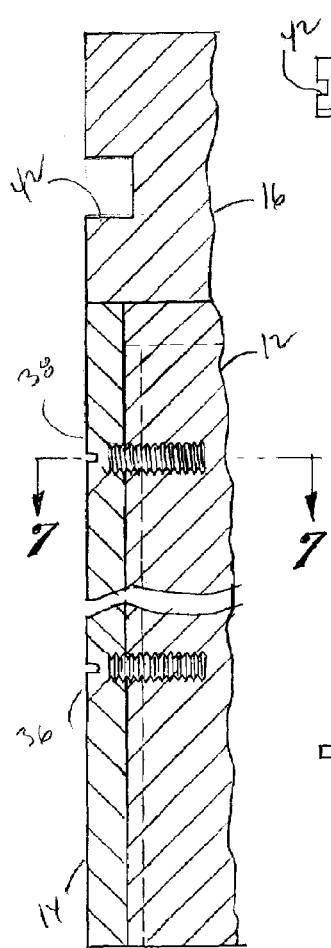
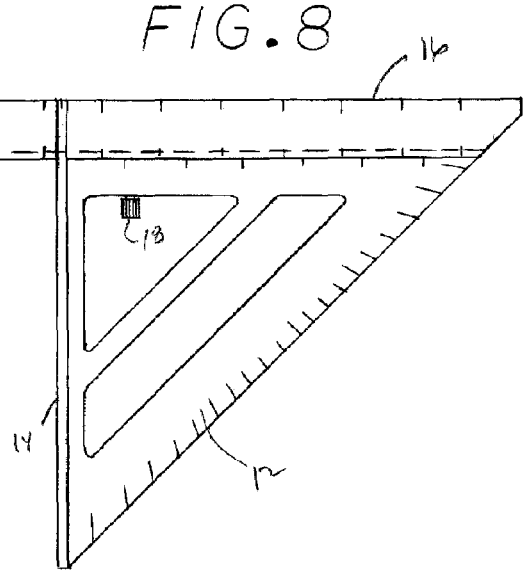
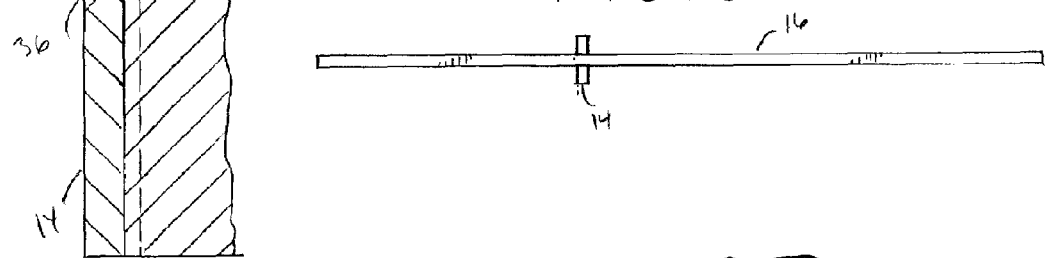
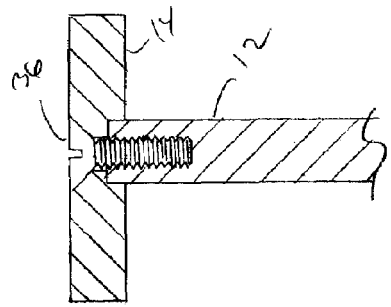
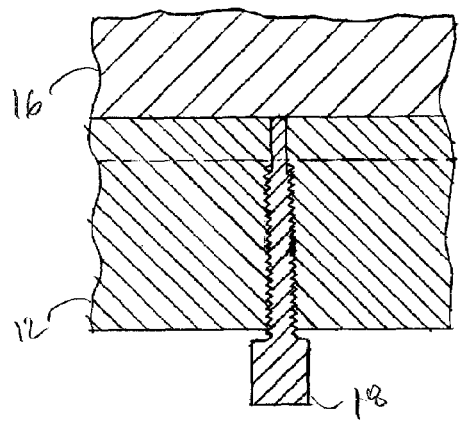
FIG. 6
FIG. 8
FIG. 9
FIG. 7
FIG. 10

SLIDING RULER SQUARE

FIELD OF THE INVENTION

The present invention relates to the field of hand square tools. More particularly, this invention is directed to a square with unique features presented by an extendible measurement straightedge element.

BACKGROUND OF INVENTION

Hand squares are well known in the construction industry being used to measure, mark and cut construction materials. Cutting materials in the building industry typically requires the measuring and marking of a work piece at pre-selected angles relative to a dimension of the work piece for purposes of fitting into structures. A variety of hand squares are known that are specialized for a particular measuring and marking functions.

For example, the combination square is typically used to measure and mark a cut line perpendicular to the edge of a plank. Framing squares are used for measuring and marking rafters or stringers. Layout squares are used for joists and studs.

The triangular square, also commonly known as a speed square, comprises a right triangular shape flat plate with units of measure scribed in convenient locations along the hypotenuse edge of the flat plate to indicate angles projected from and relative to a pivot point located at the intersection of the right angle of the flat plate and the horizontal edge of the flat plate. By positioning the pivot point at the edge of building material such as a plank of wood, and further rotating the speed square, now placed flush on the plank such that a pre-selected angle determined for marking is aligned with the edge of the plank, the vertical edge of the speed square is now defines a straight line on the plank whereby when a cut is made in the plank along this line, the cut will be at the pre-selected angle. Therefore, the triangular square may be used to determine line along which the plank should be cut to achieve the desired angle.

Prior art triangular squares are typically sized for convenience of marking and storage therefore, the vertical edge used for marking the cut line do not reach the entire required length of the cut line without the assistance of an additional straight edge or repositioning the square to the other side of the work piece.

An example of a construction task requiring multiple hand squares is framing wherein a framing square, a combination square and a triangular square are commonly required. Similarly, finishing work typically requires the use of combination and triangular squares. Consequently, multiple tools are required.

Accordingly, an objective of the present invention is to provide an improved hand square presenting sufficient features so as to reduce the number of necessary tools and to facilitate a more efficient means of measurement, marking and scribing.

SUMMARY OF INVENTION

Accordingly, the present invention is directed to a hand square for use in the construction industry, and more particularly to a sliding ruler square generally comprising a right triangularly shaped base with a fence attached to one base edge, a sliding straightedge on the other base edge and markings along the straightedge and the hypotenuse of the base and other edges of the base to present a variety of ways to measure, mark and scribe. The straightedge element, being slidably attached to the base of the square, may be adjusted to extend to provide a longer edge for marking and measuring purposes. The straightedge element positioned by the user relative to the base of square to present rule markings arranged for convenient use for a particular task thereby permitting the creation of a variety of configurations providing additional marking and scribing functionality not presented in a single fixed configuration tool.

The straightedge element approximates the shape of a ruler having a top, a bottom, a front and a back having linear rule markings on the front and back at the top and bottom edges. The straightedge element is attached at the bottom of the straightedge to the triangular base and is slidable relative to the triangular base. The top of the fence is flush with the top of the straightedge element and the intersection creates the pivot point for the square when used as a triangular square. The fence has a cut out fashioned to allow the straightedge element to be slid through the fence extending the straightedge to the left. A locking thumbscrew located in the triangular base is prevents the straightedge moving after a particular configuration is selected. Besides the linear rule marking on the straightedge element and the base, the base also has angle markings relative the pivot point along the hypotenuse edge of the base on the front and back surfaces. The straightedge element may be of any convenient length however experiments have shown that the length should be long enough to reach across a typical work piece at a typical angle encountered during framing tasks.

Sliding the straightedge to the left creates a configuration similar to a combination square when the work piece is positioned against the fence and the straightedge. Sliding the straightedge to the right with the right edge of the straightedge flush with the hypotenuse of the base yields a configuration with features of a triangular or layout square. Extending the straightedge further to the right creates configuration similar to a framing square. Other new measuring and marking functions not presented by the prior art squares are also available because of the configurability of the new square as created by the user. The many features of the new square in combination therefore substantially obviates the necessity for multiple tools, repositioning the tool relative to the typical work piece and other limitations and disadvantages of the related art.

BRIEF DESCRIPTION OF DRAWINGS

The accompanying drawings, which are incorporated in and constitute a part of this specification illustrate embodiments of the invention and, together with the description, serve to explain the features, advantages, and principles of the invention.

In the drawings:

FIG. 6 is a cross sectional view taken along lines 6—6 of FIG. 3 showing the fence screw fasteners securing the fence to the ruler square base in one embodiment of the present invention.

FIG. 7 is a cross sectional view taken along lines 7—7 of FIG. 6 showing a fence screw fasteners securing the fence to the ruler square base in one embodiment of the present invention and illustrating the recessed construction of the attachment point between the fence and the speed square base as well as the preferred centering within the thickness of the ruler square base.

FIG. 8 is a front plan view of the present invention with the extendible element extended behind the fence forming a ruler square configuration approximating a conventional layout square.

FIG. 9 is a top plan view of the present invention in the configuration of FIG. 8 with the extendible element extended behind the fence forming a ruler square configuration approximating a conventional layout square.

FIG. 10 is a cross sectional view taken along lines 10—10 of FIG. 5 further illustrating the spatial relationship between the locking thumb screw, the ruler square base and the extendible element with the locking thumb screw in a locked position.

DETAILED DESCRIPTION OF THE PREFERRED EMBODIMENT

Figure 1:
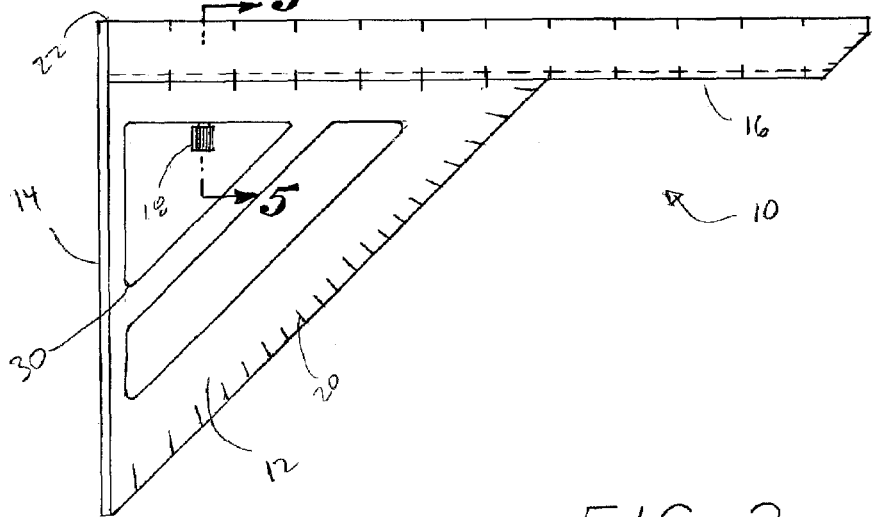
FIG. 1 is a front plan view according to the present invention showing the extendible element in a home position.

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown at 10 in FIG. 1, a new type of square used in the construction industry for assisting the marking and scribing of cut lines at pre-selected offset angles on a work piece.

Referring to FIG. 1, showing the ruler square according to the present invention, the ruler square is generally comprised of a base 12 being of a right triangular shape have a left edge, a top edge and a hypotenuse edge, a fence 14 element fixed to and integral to the base extending along the left base edge of the triangular base and an extendible straightedge element 16 movably attached to the top base edge. The left edge and the top edge form the base edges of the right triangular shape. The straightedge is secured in a pre-selected position by tightening the locking thumbscrew 18. Referring briefly to FIG. 9, the fence includes front and back portions projecting oppositely from the front and back faces of the triangular base 12 of FIG. 1 forming a substantially flat member fixed to the triangular base 12 such that the front and back portions are perpendicular to the base. An extendible straightedge element 16 is movably attached to the top base edge of the triangular base 12.

Figure 5:
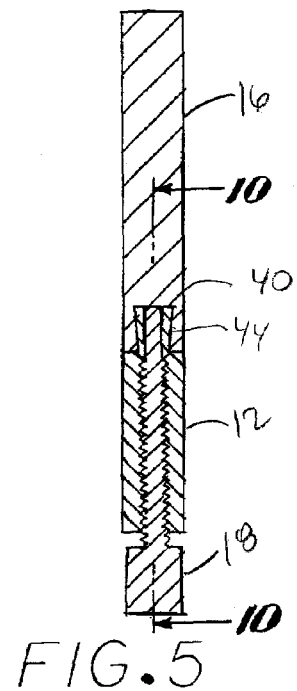
FIG. 5 is a cross sectional view taken along lines 5—5 of FIG. 1 showing the locking thumb screw placement in the ruler square base relative to the extendible element and in the locked position.

Referring to FIG. 5, the straightedge element 16 having a top edge and a bottom edge and a thickness of the base is attached so as to slide longitudinally along the base by means of a female dovetail 40 formed in the bottom edge of the straight edge accordingly sized to capture a mating male dovetail 44 fashioned into the top edge of the base 12. Alternative fastening methods may be used to create a sliding attachment of the base to the straightedge element. The locking thumbscrew 18 is inserted in a threaded hole centered in the edge of an opening in the base to accommodate access to the thumbscrew and bored through the center of the male dovetail of the base so as to protrude to touch the bottom of the female dovetail 40 of the straightedge element thereby permitting the thumbscrew to be tightened against the straightedge to restrict movement. The thumbscrew placement is further shown in FIG. 10 taken along lines 10—10 of FIG. 5. The width of the head of the thumbscrew does not exceed the thickness of the base so as to permit the square to lay flat on a surface.

The thumbscrew cutout 30 of FIG. 1 in the base permits ready access to the screw whilst grasping the square with the fence in the user's palm and thumb on one side and index figure on the other side of the base. This is a typical grasping maneuver by a user prior to positioning of the square on a work piece.

The fence extends above the base with the top end of the fence being flush with the top of the straightedge element. The fence has a slot cut to the thickness of the straightedge element and located centrally at the top of the fence thereby permitting the straightedge to slide back and forth along the top edge of the base and through the fence such that the straightedge may protrude through the fence. The intersection of the top of the fence and the top of the straightedge form the pivot point for the square as found on a typical triangular square.

Figure 11:
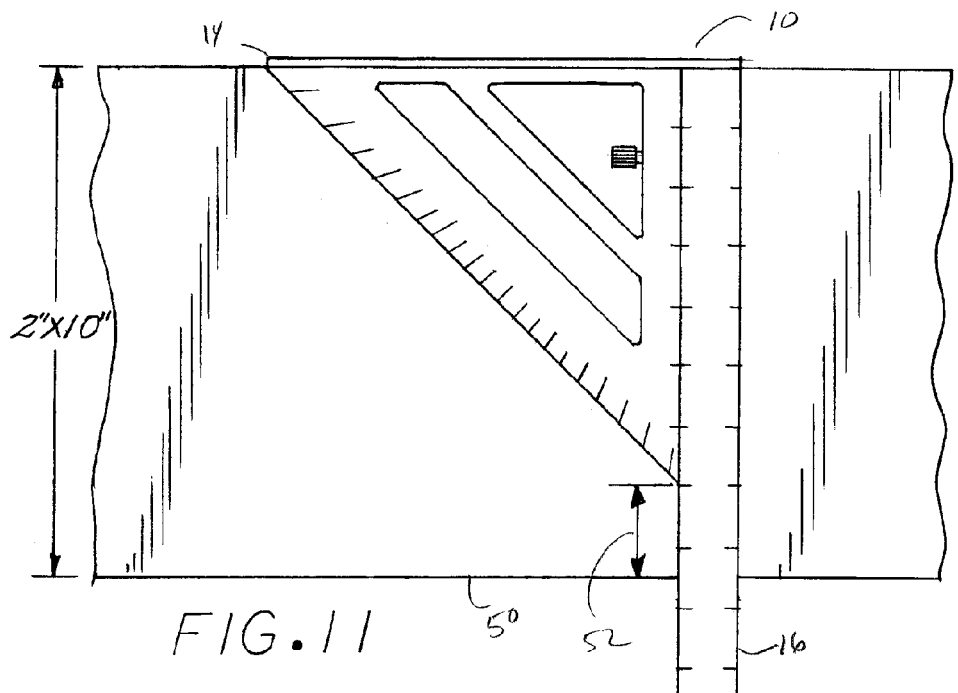
FIG. 11 is a front plan view of the present invention with the extendible element in the home position and the fence positioned square to a work piece illustrating the utility of the straightedge portion of the extendible element to reach across a standard 2"×10" plank.
Figure 12:
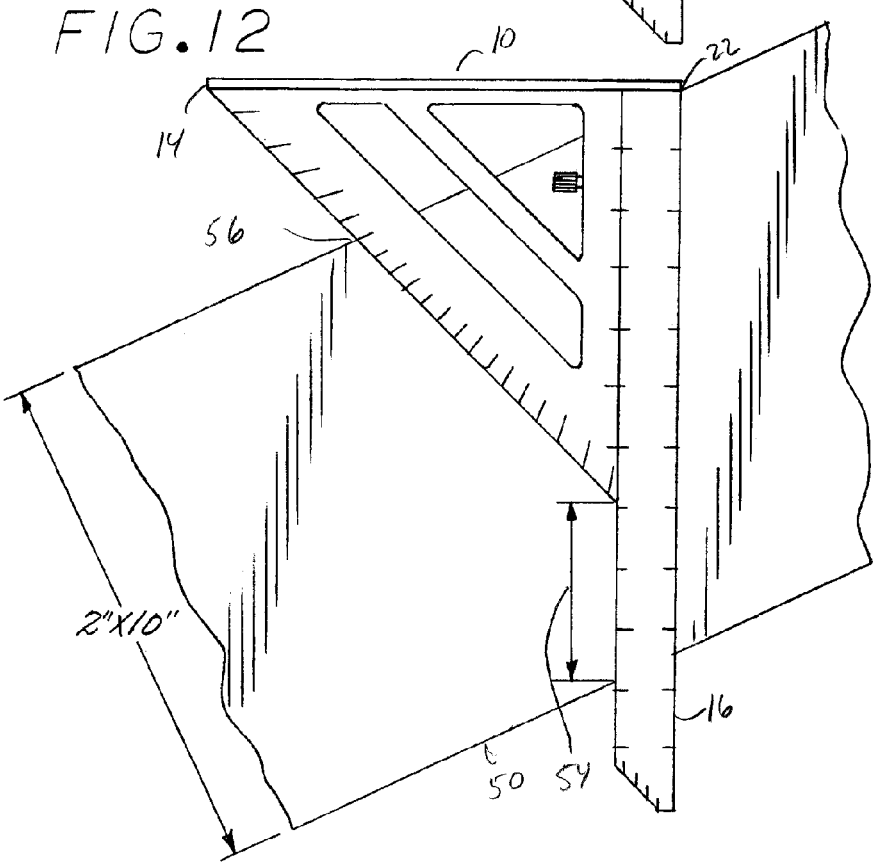
FIG. 12 is a front plan view of the present invention with the extendible element in an extended position reaching across a standard 2"×10" plank and the fence angled from the pivot point to a typical angle for marking a cut line and illustrating a capability not available when using a standard layout square.

In the preferred embodiment the straightedge has markings used for measurement purposes on the front and back faces of the along the top and bottom edges. Referring to FIG. 1, the right triangular base 12 is optionally marked on the faces of the base being along the hypotenuse with angle marks as illustrated at 20 being relative the pivot point 22. The pivot point 22 is positioned by placing the fence against the edge of a work piece at the pivot point location with the ruler square bottom face placed on the face of a work piece as illustrated in FIG. 11. The fence is rotated away from the work piece edge with the pivot point remaining in contact with the work piece until a pre-selected angle marking on the hypotenuse of the base aligns with the edge of the work piece as illustrated in FIG. 12. The top of the straightedge element is now positioned at the pre-selected angle and may be used to scribe a cut line on the work piece. The straightedge element having sufficient length to at minimum reach across the entire width of a standard 2"×10" work piece as commonly used in the construction industry, may now be slid to extend along the top edge of the base 12 to the a length sufficient so as to project the desired cut line across the entire width at angles typically required for scribing in the construction industry.

Figure 2:
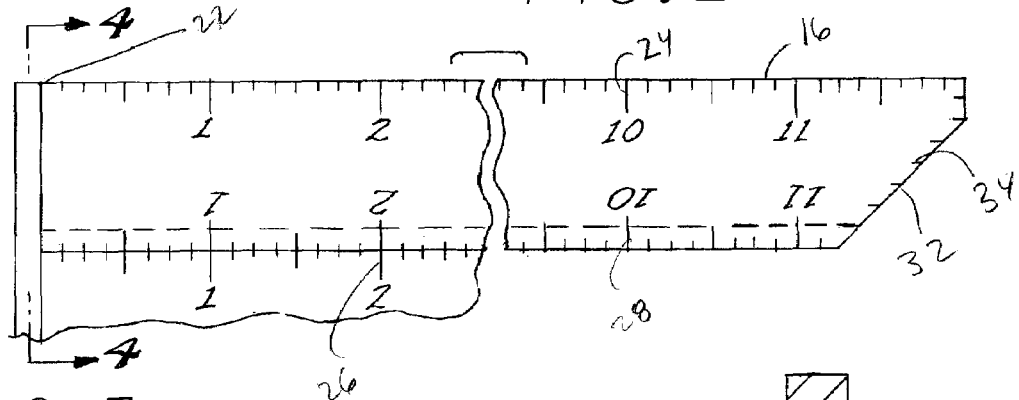
FIG. 2 is an enlarged front plan view of the extendible element in the home position and markings in one embodiment of the present invention.

As illustrated in FIG. 2, the extendible straightedge may comprise markings typified at 24 that define a linear ruler marking along the top edge of the extendible straightedge element useful for alignment with the pivot point 22 such that a user may scribe a line of a pre-selected length relative to the edge of the work piece. Similar markings along the bottom edge of the straightedge typified at 28 suitable for alignment with rule markings typified at 26 on the triangular base are useful for positioning the extendible straightedge in the home or other pre-selected position relative to the base.

Further referring to FIG. 2, additional markings typified at 34 along the right edge 32 of the straightedge element 16 form an extension of the angle markings of FIG. 1, at 20 onto the straightedge element when the straight edge element is positioned as illustrated in FIG. 8.

Figure 3:
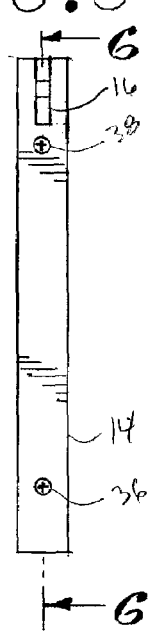
FIG. 3 is a left end view according to the present invention illustrating the fence element.
Figure 4:
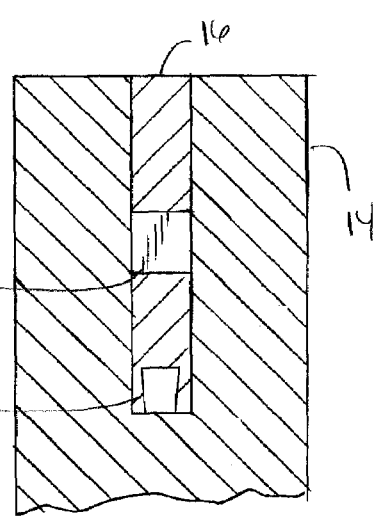
FIG. 4 is a cross sectional view taken along lines 4—4 of FIG. 2 illustrating the special relationship between the extendible element and the fence according to the present invention.

FIG. 3 illustrates the left view of the present invention showing the fence 14 attached to the base with fasteners 36 and 38. FIG. 6 taken along lines 6—6 of FIG. 3 and FIG. 7 taken along lines 7—7 of FIG. 6 show how the fasteners protrude through the fence 14 and into the left base edge of the triangular base wherein the base is drilled and threaded to accept the fasteners. The heads of the fasteners are preferably flush with the surface of the fence.

The ruler square is so engineered as to allow the extendible straightedge element to slide along the top edge of the base towards and through the fence so as to protrude through the fence to the left. This feature permits the scribing of lines with the fence placed against a work piece and without the triangular base over the work piece thereby creating a configuration similar to a combination square. The configuration of the ruler square as illustrated in FIGS. 8 and 9, permit the ruler square to be used as a combination square. Pencil cutout 42 of FIG. 8 in the left end of the straightedge provides a convenient opening to guide a pencil for marking or other scribe tool.

The preferred embodiment of the right triangular base is approximately 7" along the left and top edges with the extendible straightedge approximately 12" along the length so as to approximate a standard 1 foot ruler. 7" sides are typical of many standard hand squares. When the apparatus is configured as in FIG. 1, the straightedge element extends approximately 5" beyond the end of the base. This additional length in this home configuration provides a long straightedge for marking and scribing wide work pieces.

Although the square may be utilized in many ways, FIGS. 11 and 12 show the square of the present invention being used for scribing functions typically unobtainable by prior art squares intended for marking angled cut lines. In FIG. 11, the square shown has a base with dimensions typically found in a conveniently sized square. Note that the base with the fence 14 when placed flush against the edge of a standard 2"×10" work piece 50 does not reach across the width of the work piece, whilst the straightedge element 16 provides the additional length 52 to reach across the full width of the work piece. Still further, illustrating the advantages of the present invention, FIG. 12 shows the square 10 with fence 14 positioned along the edge of the work piece 50 and pivoted around pivot point 22 with the pre-selected angle marking 56 on the hypotenuse aligned with the edge of the work piece illustrating the additional required length 54 is also provided the straightedge element 16. Wider work pieces can be accommodated by sliding the straightedge element to an extended position to mark the cut line without repositioning the square.

Durability of the ruler square is a desirable feature for those in the construction industry whilst minimizing the cost as tools of this nature are easily lost. Therefore the preferred embodiment is constructed of aluminum plate with the optional markings being painted, etched, embossed or otherwise marked. Other materials may also be utilized. Although the preferred embodiment of the present invention as illustrated in the accompanying figures is comprised of multiple elements, the base and fence elements may be combined into one continuous component as produced by manufacturing techniques such as, but not limited to, forging, extruding, molding, or other process.

What is claimed is:

1. A ruler square comprising a triangular base being of a right triangular shape having a left edge, a top edge, a hypotenuse edge, a front face, a back face and a thickness, an extendible straightedge element having a top edge, a bottom edge, a front face, a back face with the bottom edge movably attached to the base top edge, said straightedge element having a thickness from the front to the back face being substantially the same thickness of the triangular base and so attached as to permit repositioning the straightedge by sliding the element longitudinally along the base top edge, and a fence element fixed to and integral to the base extending along the left base edge of the triangular base wherein the fence element includes front and back portions projecting oppositely from the front and back faces of the triangular base forming a substantially flat member fixed to the triangular base such that the front and back portions are perpendicular to the base and the fence extending flush with the top edge of the straightedge, having a slot cut to accommodate passage of the straightedge through the fence.

2. The ruler square of claim 1 wherein the triangular base further comprises measurement markings on the front and back of the base along the hypotenuse edge of the base and the measurement marks indicate angles relative to the pivot point as defined by the intersection of the top of the fence and the top edge of the straightedge.

3. The ruler square of claim 1 further comprising a locking thumbscrew mounted in the triangular base further having a cutout to accommodate the thumbscrew and so arranged as to tighten against the bottom edge of the straightedge element to permit a user to lock the straightedge element in place.

4. The ruler square of claim 1 being constructed of a metal.

5. The ruler square of claim 1 being constructed of plastic.

6. The ruler square of claim 1 wherein the straightedge element has linear rule measurement markings.

\* \* \* \* \*